US012392621B2

(12) United States Patent
Yano et al.

(10) Patent No.: US 12,392,621 B2
(45) Date of Patent: Aug. 19, 2025

(54) DISPLAY CONTROL SYSTEM

(71) Applicant: SUBARU CORPORATION, Tokyo (JP)

(72) Inventors: Masato Yano, Tokyo (JP); Naoto Kuriyama, Tokyo (JP); Chihiro Sugano, Tokyo (JP); Shuntaro Noguchi, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 210 days.

(21) Appl. No.: 17/853,207

(22) Filed: Jun. 29, 2022

(65) Prior Publication Data

US 2023/0011204 A1 Jan. 12, 2023

(30) Foreign Application Priority Data

Jul. 9, 2021 (JP) ................. 2021-114559

(51) Int. Cl.
*G01C 21/00* (2006.01)
*G01C 21/34* (2006.01)
*G01C 21/36* (2006.01)

(52) U.S. Cl.
CPC ..... *G01C 21/3453* (2013.01); *G01C 21/3407* (2013.01); *G01C 21/3667* (2013.01)

(58) Field of Classification Search
CPC ............ G01C 21/3453; G01C 21/3407; G01C 21/3667

See application file for complete search history.

(56) References Cited

U.S. PATENT DOCUMENTS

| 10,401,191 | B2 * | 9/2019 | Kim ................. G01C 21/3676 |
| 11,428,540 | B1 * | 8/2022 | Gray ................ G01C 21/3492 |
| 2004/0225437 | A1 * | 11/2004 | Endo ................ G08G 1/096716 |
| | | | 701/415 |

(Continued)

FOREIGN PATENT DOCUMENTS

| JP | H04-213019 A | 8/1992 |
| JP | 2006-071555 A | 3/2006 |

(Continued)

OTHER PUBLICATIONS

Office Action dated Jan. 21, 2025, from corresponding Japanese Patent Application No. 2021-114559, 10 pages.

*Primary Examiner* — Adam M Queler
*Assistant Examiner* — David Faber
(74) *Attorney, Agent, or Firm* — Rimon P.C.

(57) ABSTRACT

A display control system enhances vehicle navigation by adjusting the presentation of route information based on its reliability. The display control system includes a vehicle navigation apparatus that stores map data, displays route information, and tracks the vehicle's position. A display control apparatus determines whether the vehicle is autonomously driving and evaluates the reliability of the displayed route based on aggregated user feedback. If the reliability meets or exceeds a threshold, the route is displayed as a solid line; otherwise, it is shown as a dotted line to indicate lower confidence. By modifying how route information is presented, the system helps vehicle occupants anticipate potential discrepancies between stored map data and real-world conditions, improving navigation clarity and reducing uncertainty during automated driving.

8 Claims, 13 Drawing Sheets

(56) References Cited

U.S. PATENT DOCUMENTS

| | | | |
|---|---|---|---|
| 2004/0249568 A1* | 12/2004 | Endo | G08G 1/096888 |
| | | | 701/410 |
| 2011/0196601 A1* | 8/2011 | Miura | G01C 21/3697 |
| | | | 701/532 |
| 2016/0155311 A1* | 6/2016 | Tsai | G08B 21/0269 |
| | | | 340/539.13 |
| 2016/0321883 A1* | 11/2016 | Tsukamoto | G08B 7/066 |
| 2016/0356623 A1 | 12/2016 | Matsumoto | |
| 2017/0363430 A1* | 12/2017 | Al-Dahle | G01C 21/3815 |
| 2019/0036842 A1* | 1/2019 | Aranha | H04L 45/306 |
| 2019/0113363 A1* | 4/2019 | Kim | G01C 21/3676 |
| 2019/0171896 A1* | 6/2019 | Okada | G06V 10/255 |
| 2019/0346275 A1 | 11/2019 | Kelly et al. | |
| 2021/0011920 A1* | 1/2021 | Sudarsan | G06F 16/243 |
| 2022/0089177 A1* | 3/2022 | Wang | B60W 60/001 |
| 2022/0236064 A1* | 7/2022 | Takeda | G01C 21/30 |
| 2022/0276063 A1* | 9/2022 | Berman | G01C 21/3691 |
| 2022/0283593 A1* | 9/2022 | Teraoka | G05D 1/0274 |
| 2024/0053160 A1* | 2/2024 | Andrae | G01C 21/3484 |

FOREIGN PATENT DOCUMENTS

| | | |
|---|---|---|
| JP | 2012-137497 A | 7/2012 |
| JP | 2017-003310 A | 1/2017 |
| JP | 2017-173286 A | 9/2017 |
| JP | 2018-189549 A | 11/2018 |

\* cited by examiner

| ROUTE | RECOMMEN-DATION LEVEL | NUMBER OF ROUTES HAVING SIMILAR RECOMMENDATION LEVEL | NUMBER OF RE-SEARCHING IN PREDETERMINED TIME | DISPLAY REGION | RELIABILITY |
|---|---|---|---|---|---|
| 1 | 4 | 4 | 4 | 4 | C |
| 2 | 5 | 2 | 2 | 2 | A |
| 3 | 1 | 1 | 1 | 1 | E |
| . | . | . | . | . | . |
| . | . | . | . | . | . |
| . | . | . | . | . | . |
| X | 3 | 5 | 5 | 5 | D |
| Y | 2 | 4 | 4 | 5 | D |
| Z | 4 | 5 | 4 | 4 | C |
| α | 4 | 5 | 2 | 2 | B |

FIG. 5

DISPLAY CONTROL SYSTEM

CROSS-REFERENCE TO RELATED APPLICATIONS

The present application claims priority from Japanese Patent Application No. 2021-114559 filed on Jul. 9, 2021, the entire contents of which are hereby incorporated by reference.

BACKGROUND

The technology relates to a display control system.

In recent years, technologies relating to automatic driving, including driving assistance technologies, have seen remarkable progress and attracted a great deal of attention from around the world with many companies from different industries entering the market.

Among these automatic driving technologies, automatic driving with an automatic driving level 3 or higher (automatic driving at level 3 includes a driving assistance mode) is approaching a practical stage.

The automatic driving with an automatic driving level 3 or higher may involve acquiring a high-definition map including the latest information on details of objects on the ground from, for example, a server, and performing automatic driving on the basis of the acquired information.

In contrast, a vehicle navigation apparatus provides map information using a navigation map stored in an internal storage, searches the map information for an optimal route to a destination point, and performs route guidance on the basis of the result of search, as in a known method. Reference is made to Japanese Unexamined Patent Application Publication No. 2017-173286, for example.

SUMMARY

An aspect of the technology provides a display control system including a vehicle navigation apparatus and a display control apparatus. The vehicle navigation apparatus includes: a storage configured to store first map information; a position information acquisition unit configured to acquire position information on a position of a vehicle; a route information searching unit configured to search for route information about a route on the basis of the position information, destination information on a destination point to be set by an occupant of the vehicle, and the first map information; a display configured to display data including the first map information, the route information, and the position information to the occupant of the vehicle; and a display control unit configured to control a form of displaying the data on the display. The display control apparatus includes at least one processor, and at least one memory communicably coupled to the at least one processor. The at least one processor is configured to determine a driving entity of the vehicle, calculate or evaluate at least reliability of the route information included in the first map information in a case where the driving entity of the vehicle is determined as being the vehicle itself, and send the display control unit display control information to change a form of displaying the route information on the display in accordance with the reliability.

An aspect of the technology provides a display control system including a storage, a display, and circuitry. The storage is configured to store first map information. The display is configured to display data including the first map information, route information, and position information on a position of a vehicle to an occupant of the vehicle. The circuitry is configured to acquire the position information, search for the route information on the basis of the position information, destination information on a destination point to be set by the occupant of the vehicle, and the first map information, control a form of displaying the data on the display, and determine a driving entity of the vehicle. In a case where the driving entity of the vehicle is determined as being the vehicle itself, the circuitry is configured to calculate or evaluate at least reliability of the route information included in the first map information, and generate display control information to change a form of displaying the route information on the display in accordance with the reliability.

BRIEF DESCRIPTION OF THE DRAWINGS

The accompanying drawings are included to provide a further understanding of the technology and are incorporated in and constitute a part of this specification. The drawings illustrate example embodiments and, together with the specification, serve to explain the principles of the technology.

FIG. 5 is a table indicating an exemplary relationship of the recommendation level of each route, the level regarding the number of routes having a similar recommendation level, the level regarding the number of re-searching in a predetermined time, and the level regarding a display region with the reliability.

DETAILED DESCRIPTION

Figure 1:
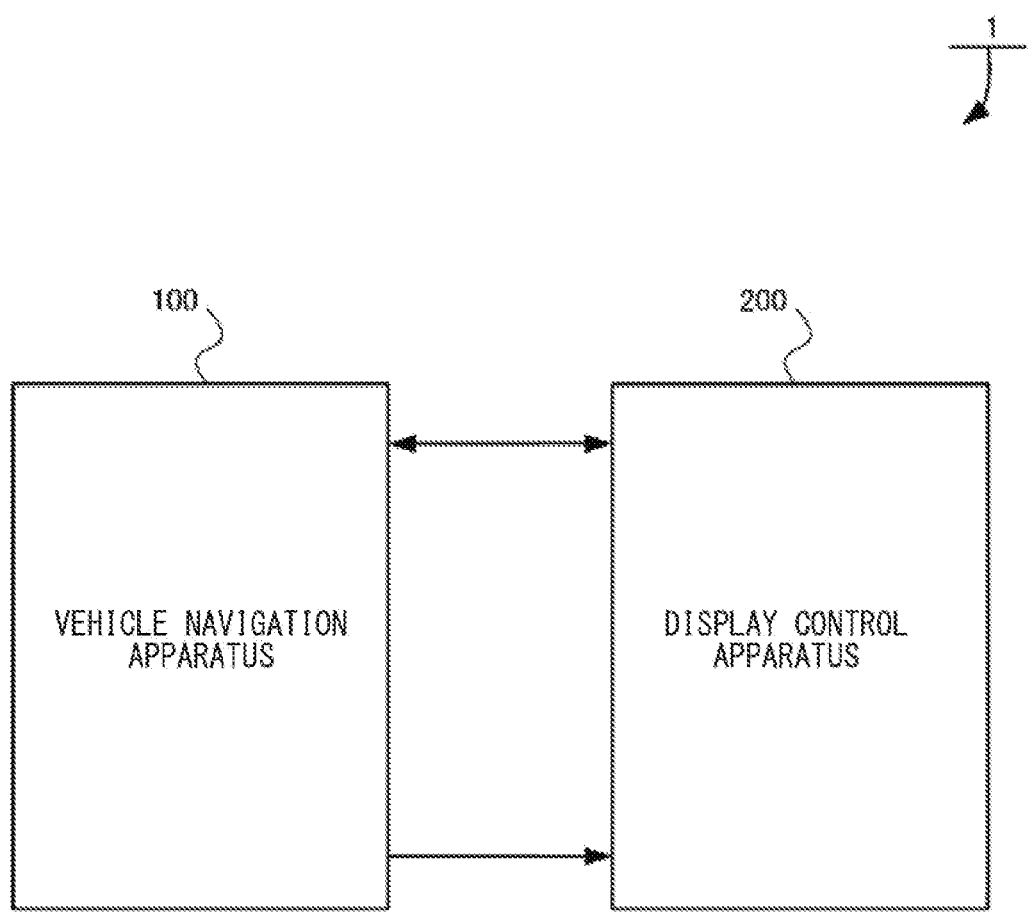
FIG. 1 is a block diagram illustrating an exemplary configuration of a display control system according to one example embodiment of the technology.

A navigation map is generally updated at a constant interval because a process for updating the navigation map takes time and costs.

That is, the navigation map is older than a high-definition map of which information is frequently updated.

Due to discrepancies between the navigation map and the high-definition map, a vehicle can be displayed as traveling on a road inexistent in the navigation map, or due to an influence of a map-matching function, a vehicle can be displayed as traveling in a zig-zag manner. This can make an occupant of the vehicle feel strange.

To address such a concern, it is desirable to provide a display control system that reduces the strange feeling of the occupant of the vehicle by changing the form of displaying a traveling road on which an own vehicle is to travel in accordance with the reliability of route information to thereby allow the occupant of the vehicle to recognize in advance an unexpected course change to be generated in an automatic driving mode or a driving assistance mode.

In the following, some example embodiments of the technology are described in detail with reference to FIGS. 1 to 13. Note that the following description is directed to illustrative examples of the disclosure and not to be construed as limiting to the technology. Factors including, without limitation, numerical values, shapes, materials, components, positions of the components, and how the components are coupled to each other are illustrative only and not to be construed as limiting to the technology. Further, elements in the following example embodiments which are not recited in a most-generic independent claim of the disclosure are optional and may be provided on an as-needed basis. The drawings are schematic and are not intended to be drawn to scale. Throughout the present specification and the drawings, elements having substantially the same function and configuration are denoted with the same reference numerals to avoid any redundant description. In addition, elements that are not directly related to any embodiment of the technology are unillustrated in the drawings.

First Example Embodiment

A display control system 1 according to a first example embodiment of the technology will now be described with reference to FIGS. 1 to 10.

<Exemplary Configuration of Display Control System 1>

As illustrated in FIG. 1, the display control system 1 according to the first example embodiment of the technology includes a vehicle navigation apparatus 100 and a display control apparatus 200.

The vehicle navigation apparatus 100 may search navigation map information for route information on a route to a destination point set by an occupant of a vehicle. In one embodiment, the navigation map information may serve as "first map information". The vehicle navigation apparatus 100 may display the route information on the basis of the retrieved route and the first map information, to thereby provide route guidance to the occupant.

The navigation map information serving as the first map information may be updated at a constant interval.

The vehicle navigation apparatus 100 may receive information on road conditions such as traffic information, and display traffic congestion information about surrounding roads including the retrieved route in addition to the route information.

According to the first example embodiment of the technology, in a case where a driving entity of the own vehicle including the vehicle navigation apparatus 100 is the vehicle itself, the vehicle navigation apparatus 100 changes the form of displaying a part of a route sent from the display control apparatus 200 (described below) on a display (described below) on the basis of display control information.

The display control apparatus 200 calculates the reliability of each piece of the route information on the basis of a predetermined relational expression, sends the vehicle navigation apparatus 100 the display control information to change the form of displaying each pieces of the route information in accordance with the calculated reliability of the piece of the route information, and changes the form of displaying the route on the vehicle navigation apparatus 100.

<Exemplary Configuration of Vehicle Navigation Apparatus 100>

Figure 2:
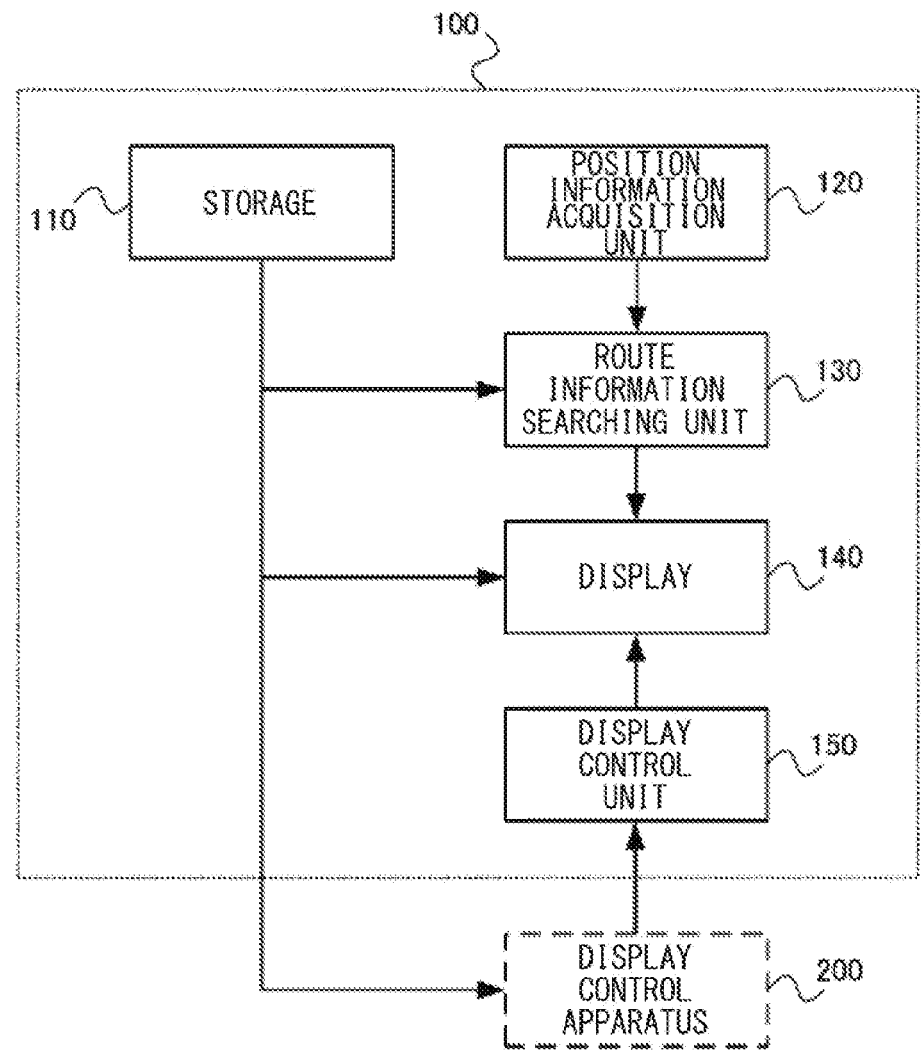
FIG. 2 is a block diagram illustrating an exemplary configuration of a vehicle navigation apparatus according to one example embodiment of the technology.

As illustrated in FIG. 2, the vehicle navigation apparatus 100 according to the first example embodiment includes a storage 110, a position information acquisition unit 120, a route information searching unit 130, a display 140, and a display control unit 150.

The storage 110 stores the navigation map information serving as the first map information.

For example, the storage 110 may include a storage medium and a reading device. The storage medium may store the navigation map information necessary for navigation including map displaying, facility searching, and route searching. The reading device may read the navigation map information from the storage medium.

Alternatively, the storage 110 may include a hard disk device and a semiconductor memory.

The position information acquisition unit 120 may include, for example, a GPS receiver, an azimuth sensor, and a range sensor. The position information acquisition unit 120 may acquire information on the position (e.g., the latitude and longitude) of the own vehicle at a predetermined timing, to thereby acquire the information on the position of the own vehicle.

The route information searching unit 130 may perform a route searching process. In the route searching process, the route information searching unit 130 may search for a route (guidance route) connecting a departure point to a destination point set by the occupant in accordance with a predetermined searching condition. For example, the route information searching unit 130 may search for the route information on the basis of the information on the position of the own vehicle, the information on the destination point set by the occupant, and the navigation map information serving as the first map information.

The display 140 may be a liquid crystal display (LCD), for example. The display 140 may display images, such as a map image of a surrounding area around the position of the own vehicle, an intersection guidance image, or a searching result image that includes detailed information on facilities obtained as a result of facility searching, on the basis of image signals outputted from a navigation controller (not illustrated). For example, the display 140 displays data including the navigation map information serving as the first map information, the route information, and the information on the position of the own vehicle to the occupant of the vehicle.

The display control unit 150 controls the form of displaying on the display 140 on the basis of map-image drawing data received from a non-illustrated controller of the vehicle navigation apparatus 100 or the display control apparatus 200 described below.

<Exemplary Configuration of Display Control Apparatus 200>

Figure 3:
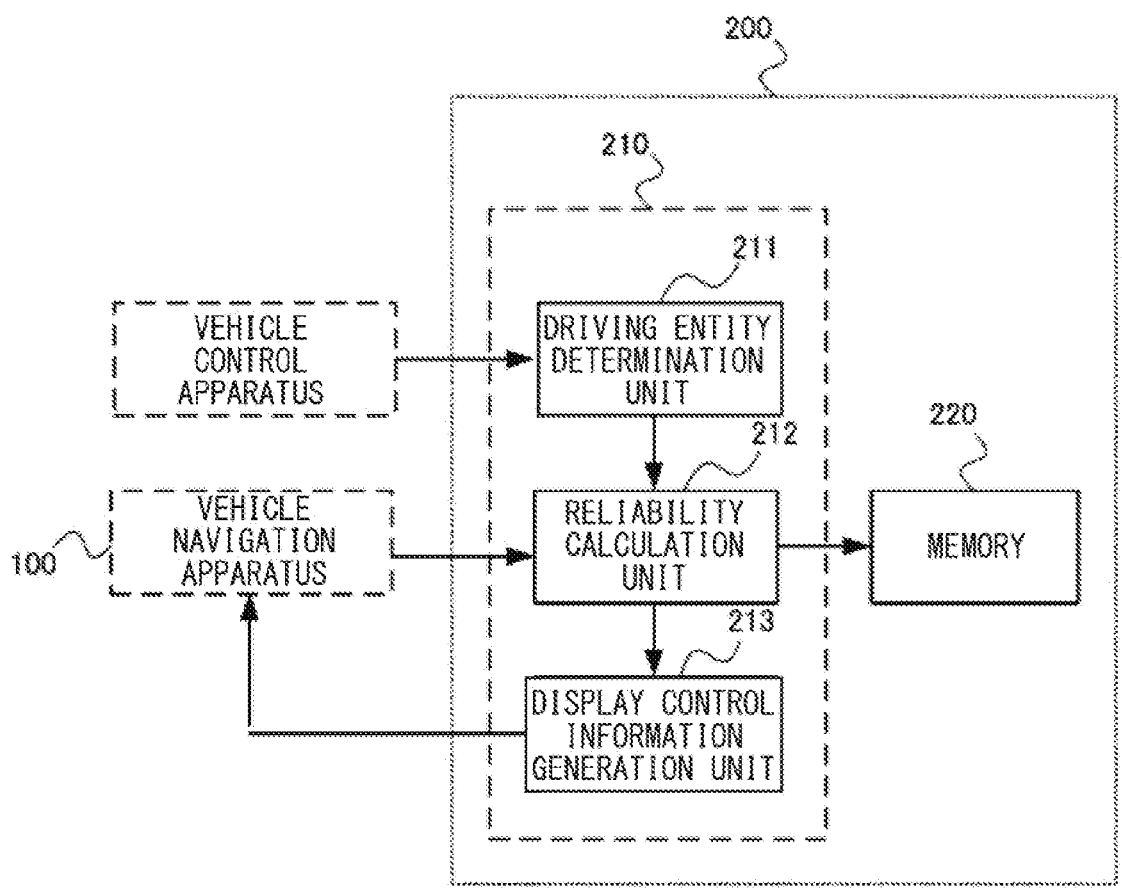
FIG. 3 is a block diagram illustrating an exemplary configuration of a display control apparatus according to one example embodiment of the technology.

As illustrated in FIG. 3, the display control apparatus 200 according to the first example embodiment includes a processor 210 and a memory 220.

The processor 210 may comprehensively control the display control apparatus 200 in accordance with a control program stored in the memory 220 described below.

In the first example embodiment, the processor 210 may execute processes performed by a driving entity determination unit 211, a reliability calculation unit 212, and a display control information generation unit 213 that are described below, for example.

The memory 220 may include, for example, a read-only memory (ROM) and a random access memory (RAM). The ROM may store programs including the control program described above, and the RAM may store various kinds of data, for example.

In the first example embodiment, the route information received from the vehicle navigation apparatus 100 may be stored in the RAM in correlation with the reliability of the route information calculated by the reliability calculation unit 212 described below.

<Exemplary Configuration of Processor 210>

As illustrated in FIG. 3, the processor 210 may include the driving entity determination unit 211, the reliability calculation unit 212, and the display control information generation unit 213.

The driving entity determination unit 211 may receive information as to whether the own vehicle is driven in the automatic driving mode or the driving assistance mode from a vehicle control apparatus mounted in the own vehicle, to thereby determine the driving entity of the own vehicle.

The driving entity determination unit 211 may output the result of determination to the reliability calculation unit 212.

The reliability calculation unit 212 may calculate the reliability of the route information retrieved by the route information searching unit 130 on the basis of Expression 1 as follows.

Reliability=recommendation level/(number of routes having a similar recommendation level×number of re-searching in a predetermined time×display region)    Expression 1

In Expression 1, the "recommendation level" may refer to an index obtained by, for example, collecting feedback on the route information included in the navigation map information from users who have experienced traveling on the route. If the recommendation level is held by the vehicle navigation apparatus 100, the recommendation level may be acquired from the vehicle navigation apparatus 100.

If the recommendation level is held by a non-illustrated server, for example, the reliability calculation unit 212 may receive the recommendation level directly from the server.

The "number of routes having a similar recommendation level" may refer to the number of routes similar to each other in the recommendation level. For example, if there are two or more pieces of the route information about a route from a current position of the own vehicle to a certain point, the number of routes having a similar recommendation level may be determined on the basis of the recommendation level of one of the multiple pieces of the route information.

The similarity may be determined on the basis of the numeric value or degree of each route. In a case where the recommendation level is classified into several levels, routes having the same level may be determined as having the similarity.

The "number of re-searching in a predetermined time" may refer to, for example, the number of re-searching for certain route information included in the navigation map information.

The "display region" may refer to, for example, the scale of certain route information included in the navigation map information and displayed on the screen of the display 140.

Note that, in a case where there are some points (waypoints) intersecting with a route of the high-definition map between the current position of the own vehicle and the destination point, the "route" may include a route from the current position of the own vehicle to one of the waypoints, a route between two adjacent ones of the waypoints, and a route from one of the waypoints to the destination point.

The display control information generation unit 213 generates the display control information to change the form of displaying the route information on the display 140 in accordance with, for example, the reliability calculated by the reliability calculation unit 212, and sends the display control information to the vehicle navigation apparatus 100.

<Exemplary Processing Performed by Display Control System 1>

Exemplary processing performed by the display control system 1 according to the first example embodiment of the technology will now be described with reference to FIGS. 4 to 10.

Figure 4:
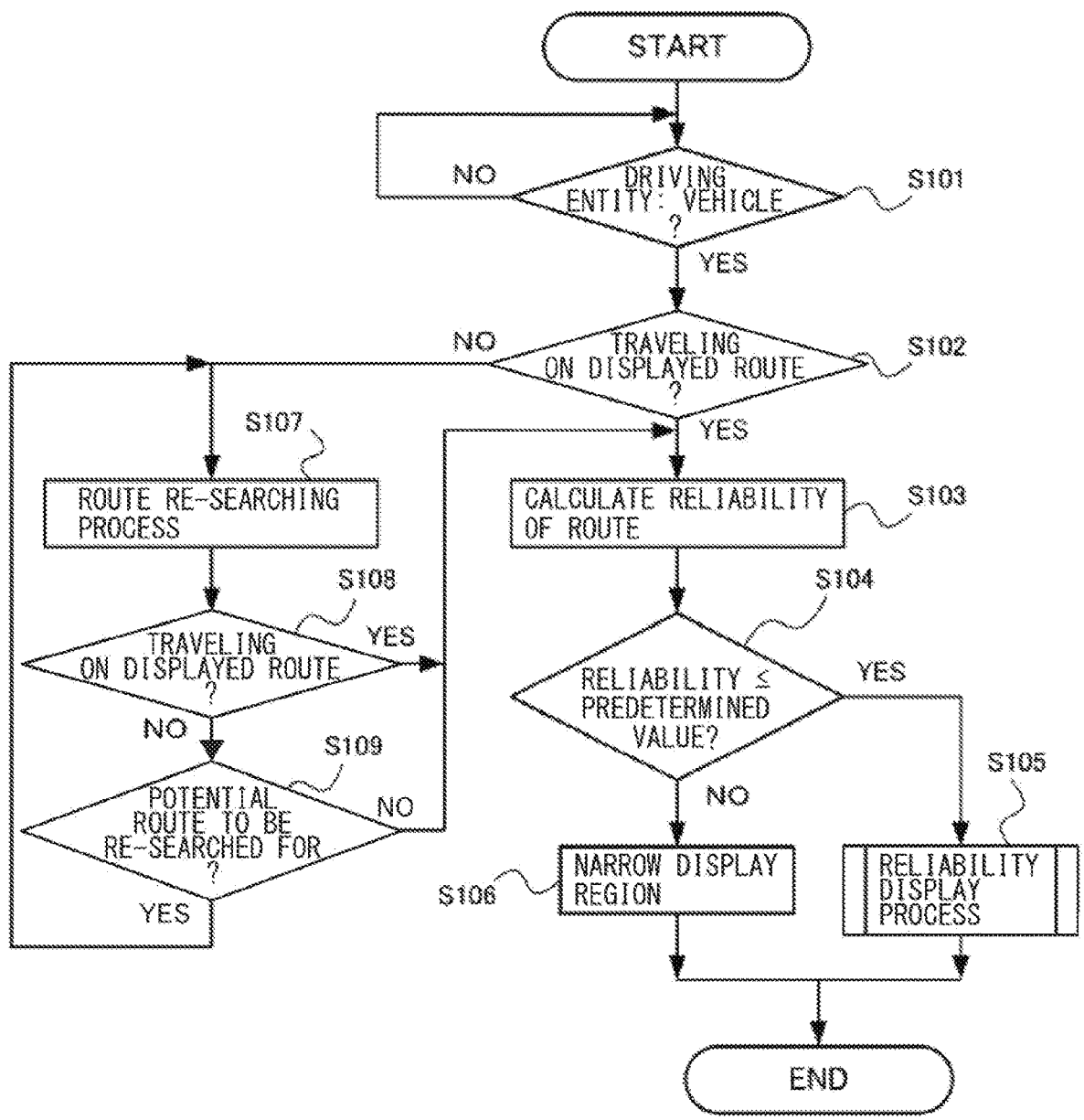
FIG. 4 is a flowchart illustrating an exemplary flow of processing performed by the display control apparatus according to one example embodiment of the technology.

As illustrated in FIG. 4, the driving entity determination unit 211 may receive the information as to whether the own vehicle is driven in the automatic driving mode or the driving assistance mode from, for example, the vehicle control apparatus mounted in the own vehicle, to thereby determine the driving entity of the own vehicle (Step S101).

If the driving entity determination unit 211 does not determine that the driving entity of the own vehicle is the vehicle (Step S101: NO), the processing may repeat Step S101.

In contrast, if the driving entity determination unit 211 determines that the driving entity of the own vehicle is the vehicle (Step S101: YES), the processor 210 may determine whether the own vehicle is traveling on the route displayed on the vehicle navigation apparatus 100 on the basis of the route information and the information on the position of the own vehicle received from the vehicle navigation apparatus 100 (Step S102).

If the processor 210 determines that the own vehicle is traveling on the route displayed on the vehicle navigation apparatus 100 (Step S102: YES), the processing may proceed to Step S103 in which a command to start a process for calculating the reliability of route information displayed is sent to the reliability calculation unit 212.

The reliability calculation unit 212 may calculate the reliability of the route information displayed on the basis of Expression 1 described above and the information acquired from the vehicle navigation apparatus 100 and other components (Step S103).

FIG. 5 illustrates the reliability of each piece of the route information calculated by the reliability calculation unit 212.

As illustrated in FIG. 5, the reliability may be classified into five levels including Levels A to E in descending order.

In the example illustrated in FIG. 5, the reliability at Level C or lower may be determined as being low.

Among the parameters including the recommendation level, the number of routes having a similar recommendation level, the number of re-searching in the predetermined time, and the display region that are used to calculate the reliability, the recommendation level may be classified into five levels with Level 5 being the highest level.

The number of routes having a similar recommendation level and the number of re-searching in the predetermined time may be each classified into five levels in descending order of number.

The display region may be classified into five levels in descending order of area of the region.

The display control information generation unit 213 may determine whether the reliability of the route information is less than or equal to a predetermined value (e.g., Level C in FIG. 5) on the basis of the reliability acquired from the reliability calculation unit 212, the route information displayed (Step S104).

The predetermined value may be, for example, an average value of all the reliability or a certain value set in accordance with the specifications. The predetermined value may be changed as appropriate.

If the display control information generation unit 213 determines that the reliability of the route information is less than or equal to the predetermined value (e.g., Level C in FIG. 5) (Step S104: YES), the processing may proceed to Step S105 in which a reliability display process is performed to generate the display control information. Thereafter, the processing may end.

Note that the reliability display process may be described in detail below.

In contrast, if the display control information generation unit 213 does not determine that the reliability of the route information is less than or equal to the predetermined value (e.g., Level C in FIG. 5) (Step S104: NO), the processing may proceed to Step S106 in which display control information that narrows the display region is generated. Thereafter, the processing may end.

If the processor 210 does not determine that the own vehicle is traveling on the route displayed on the vehicle navigation apparatus 100 (Step S102: NO), the processor 210 may cause the processing to proceed to Step S107 in which a route re-searching process in performed. Thereafter, the processor 210 may determine again whether the own vehicle is traveling on the route displayed on the vehicle navigation apparatus 100 (Step S108).

If the processor 210 determines that the own vehicle is traveling on the route displayed on the vehicle navigation apparatus 100 (Step S108: YES), the processor 210 may cause the processing to proceed to Step S103 in which the command to start the process for calculating the reliability of the route information displayed is sent to the reliability calculation unit 212.

In contrast, if the processor 210 does not determine that the own vehicle is traveling on the route displayed on the vehicle navigation apparatus 100 (Step S108: NO), the processor 210 may determine whether there is a potential route to be re-searched for (Step S109). If the processor 210 determines that there is no potential route to be re-searched for (Step S109: NO), the processor 210 may cause the processing to proceed to Step S103. In contrast, if the processor 210 determines that there is a potential route to be re-searched for (Step S109: YES), the processor 210 may cause the processing to proceed to Step S107.

<Reliability Display Process>

The reliability display process according to the first example embodiment of the technology will now be described with reference to FIGS. 6 to 10.

Figure 6:
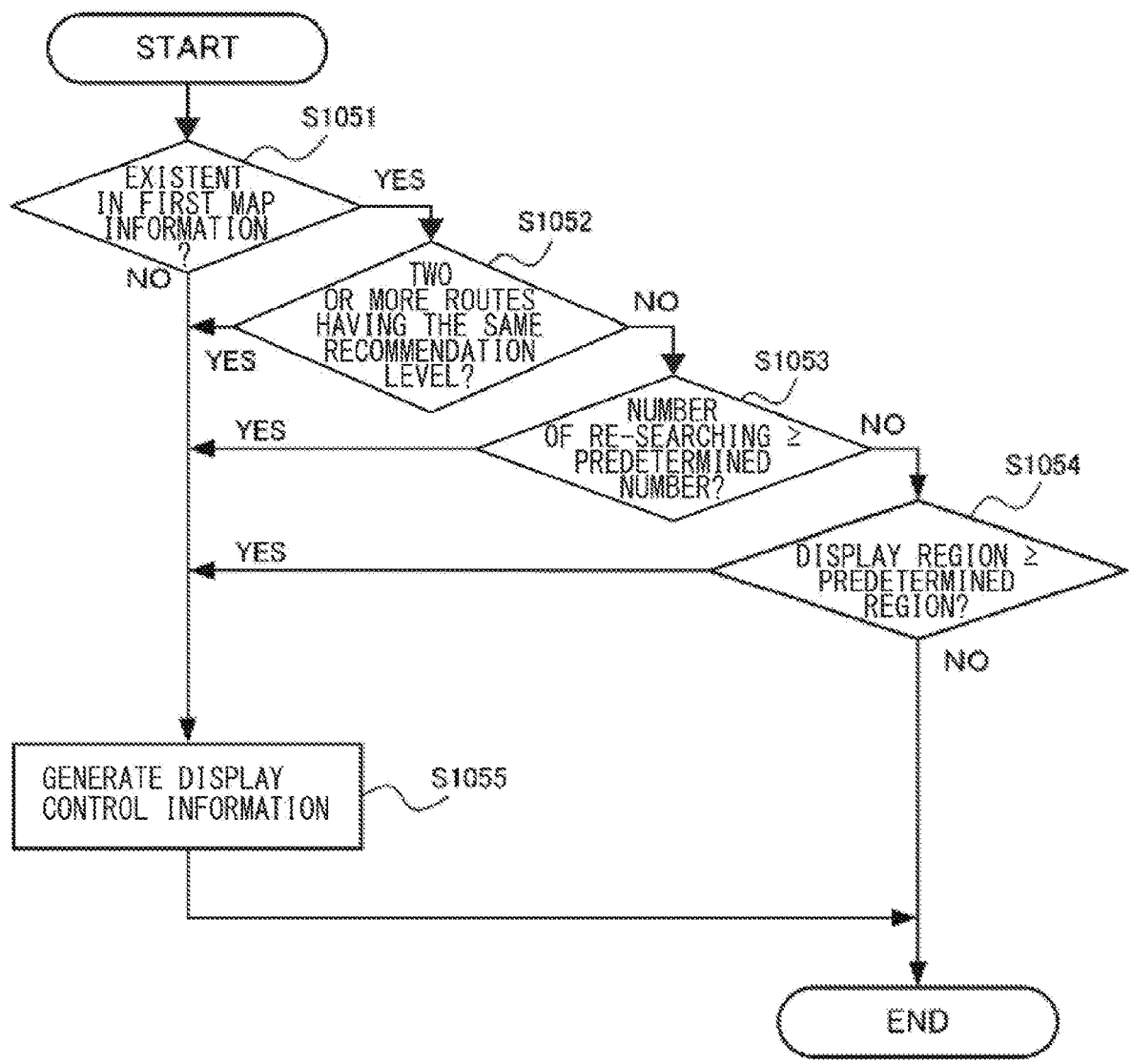
FIG. 6 is a flowchart illustrating an exemplary flow of a route reliability calculation process according to one example embodiment of the technology.

As illustrated in FIG. 6, if the own vehicle is not traveling on the route displayed on the display 140, the display control information generation unit 213 may determine that the route information is inexistent in the first map information (the navigation map) (Step S1051: NO).

In this case, the reliability of the route information may be determined as being low, and thus the display control information may be generated (Step S1055).

That is, as there is no recommendation level for the route inexistent in the first map information (the navigation map), the reliability calculated by the reliability calculation unit 212 may be 0 (zero), and the reliability may thus be determined as being at Level E regardless of the levels of the other parameters.

The reliability of the route information may thus be determined as being low, and the display control information generation unit 213 may generate the display control information.

Figure 7:
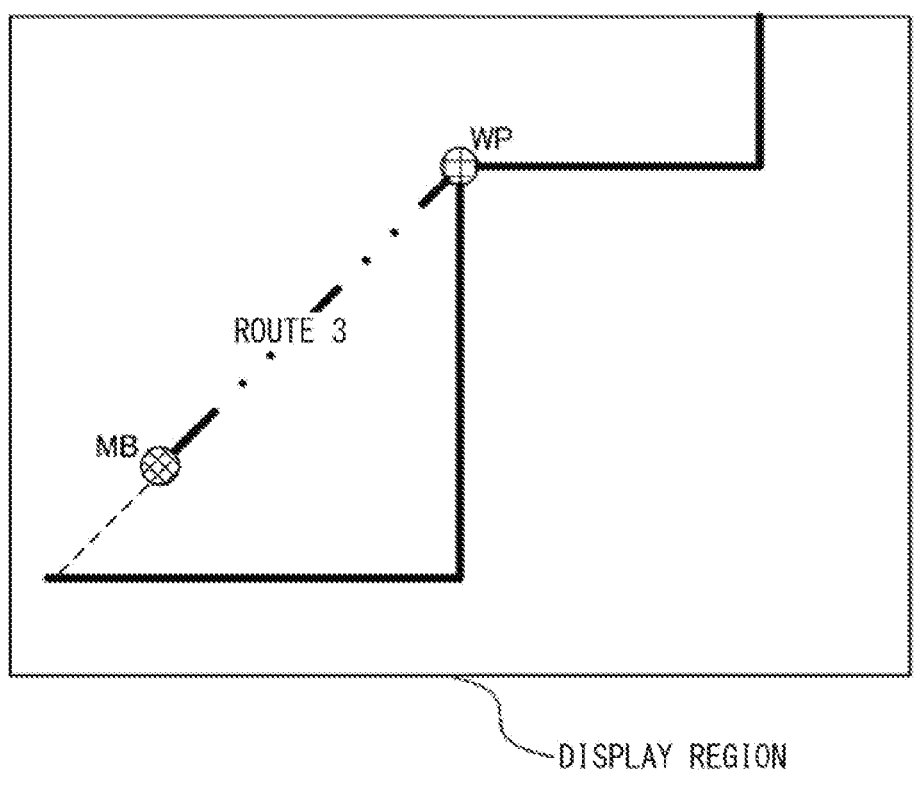
FIG. 7 is a diagram illustrating an exemplary form of displaying route information that does not match with first map information, according to one example embodiment of the technology.

Referring to FIGS. 5 and 7 for detailed description, the route satisfying the above-described condition may correspond to, for example, Route 3 in FIG. 5.

Route 3 in FIG. 5 may be a route on which an own vehicle MB is traveling and which is existent in the high-definition map. In FIG. 7, Route 3 is indicated by a broken line. Route 3 may intersect with a route of the first map information indicated by a solid line in FIG. 7 at a waypoint WP.

Accordingly, the display control information generation unit 213 may generate the display control information that causes the route from the own vehicle MB to the waypoint WP to be displayed by a dotted line unlike the other routes.

In contrast, if the route information is determined as being existent in the first map information (the navigation map) (Step S1051: YES), the display control information generation unit 213 may cause the process to proceed to Step S1052.

In Step S1052, the display control information generation unit 213 may determine whether there are two or more routes having the same recommendation level as that of the route on which the own vehicle MB is traveling and which is displayed on the display 140 (Step S1052).

Figure 8:
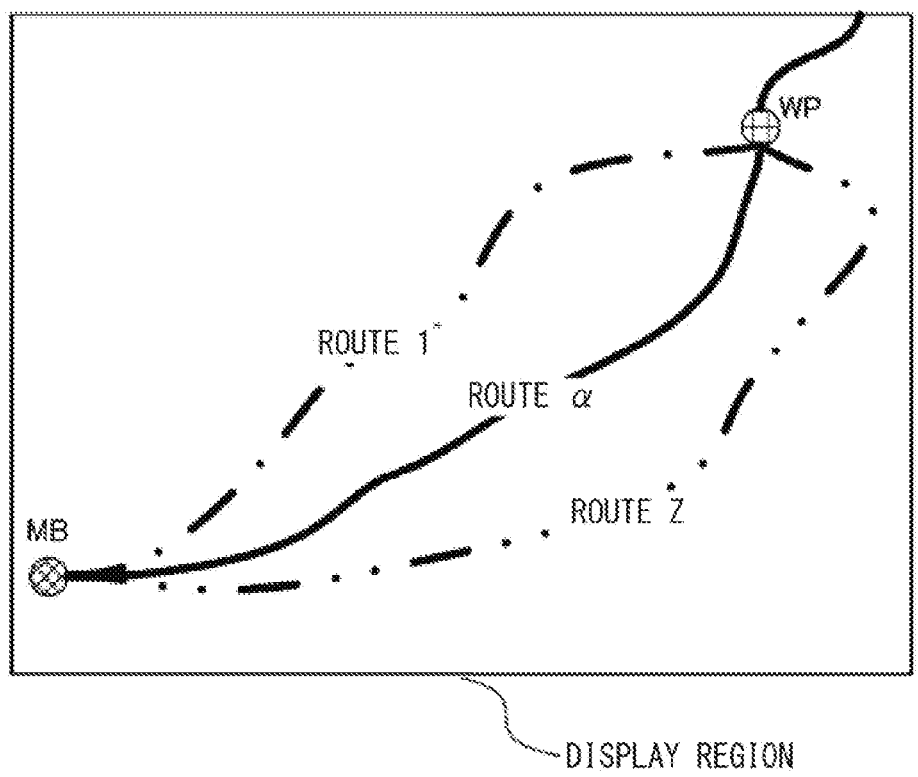
FIG. 8 is a diagram illustrating an exemplary form of displaying multiple pieces of route information having the same recommendation level as a certain piece of the route information, according to one example embodiment of the technology.

Referring to FIGS. 5 and 8 for detailed description, the route satisfying the above-described condition may correspond to, for example, Route 1 in FIG. 5.

As illustrated in FIG. 5, the recommendation level of Route 1 may be 4, and Route Z and Route α may have the same recommendation level 4.

That is, in a case where the route on which the own vehicle MB is traveling and which is displayed on the display 140 corresponds to Route 1 in FIG. 5, for example, Route 1 may satisfy the condition that there are two or more routes having the same recommendation level (Step S1052: YES).

Additionally, as illustrated in FIG. 5, Route 1 and Route Z each may have reliability at the same level, Level C or lower, and may thus be classified as routes having low reliability. Thus, as illustrated in FIG. 8, the display control information may be generated that causes each of Route 1 and Route Z to be displayed with a dotted line as a route from the own vehicle MB to the waypoint WP.

Route α may have reliability at Level B and may be classified as a route having high reliability. Thus, as illustrated in FIG. 8, Route α may be displayed in an ordinary form of displaying, i.e., with a thick solid line.

Note that the two or more routes having the same recommendation level may be continuously displayed on the display 140 while the own vehicle is traveling.

In contrast, if it is not determined that there are two or more routes having the same recommendation level as the route on which the own vehicle MB is traveling and which is displayed on the display 140 (Step S1052: NO), the display control information generation unit 213 may cause the process to proceed to Step S1053.

The display control information generation unit 213 may determine whether the number of re-searching for the route on which the own vehicle MB is traveling and which is displayed on the display 140 is greater than or equal to a predetermined number (Step S1053).

Figure 9:
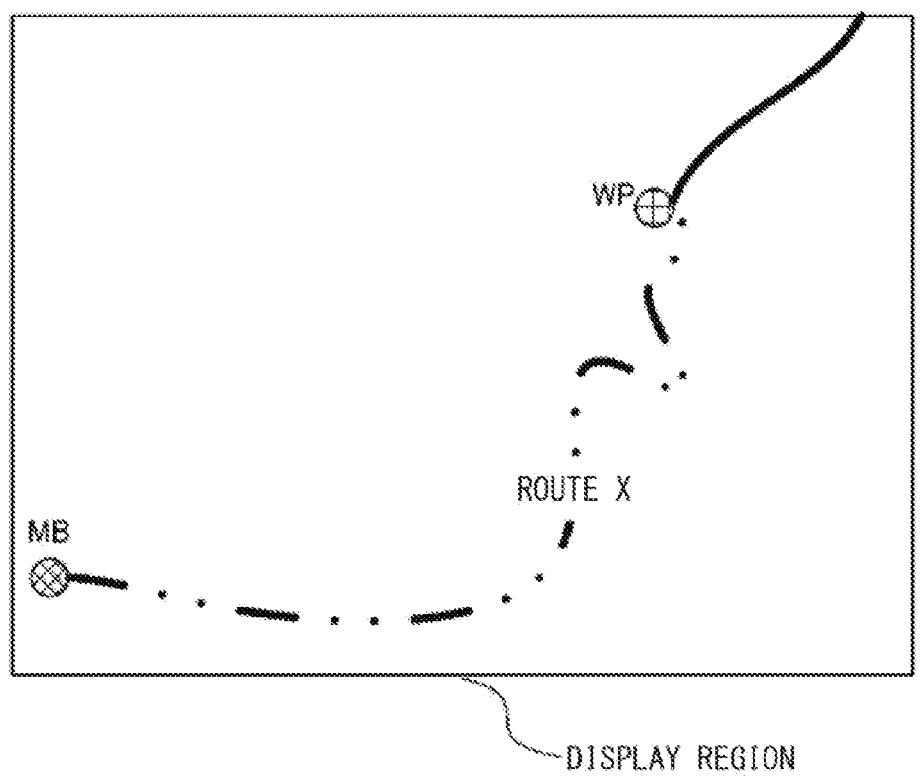
FIG. 9 is a diagram illustrating an exemplary form of displaying the route information in a case where the number of re-searching requests is greater than or equal to a predetermined number, according to one example embodiment of the technology.

Referring to FIGS. 5 and 9 for detailed description, the route satisfying the above-described condition may correspond to, for example, Route X in FIG. 5.

For example, as illustrated in FIG. 5, the number of re-searching for Route X in the predetermined time may be 5. Route X may thus satisfy the condition that the number of re-searching is greater than or equal to the predetermined number (Step S1053: YES).

Additionally, as illustrated in FIG. 5, Route X may have reliability at Level D and thus be classified as a route having low reliability. Thus, as illustrated in FIG. 9, the display control information may be generated that causes Route X to be displayed with a dotted line as a route from the own vehicle MB to the waypoint WP.

In contrast, if it is not determined that the number of re-searching for the route on which the own vehicle MB is traveling and which is displayed on the display 140 is greater than or equal to the predetermined number (Step S1053: NO), the display control information generation unit 213 may cause the process to proceed to Step S1054.

The display control information generation unit 213 may determine whether the display region of the route on which the own vehicle MB is traveling and which is displayed on the display 140 is greater than or equal to a predetermined region (Step S1054).

Figure 10:
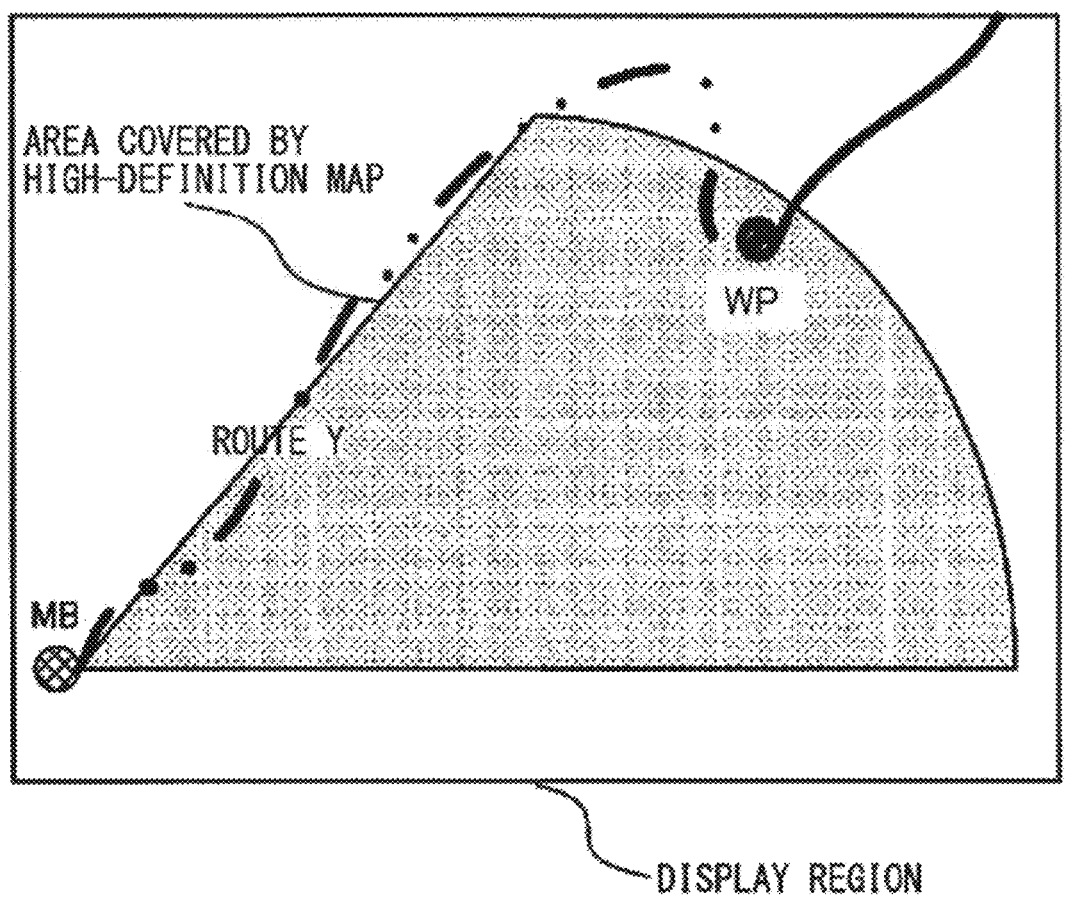
FIG. 10 is a diagram illustrating an exemplary form of displaying the route information in a case where a display region is greater than or equal to a predetermined region, according to one example embodiment of the technology.

Referring to FIGS. 5 and 10 for detailed description, the route satisfying the above-described condition may correspond to, for example, Route Y in FIG. 5.

For example, as illustrated in FIG. 5, the display region of Route Y may be at Level 5, and thus satisfy the condition that the display region is greater than or equal to the predetermined region (Step S1054: YES).

Additionally, as illustrated in FIG. 5, Route Y may have reliability at Level D and thus be classified as a route having low reliability. Thus, as illustrated in FIG. 10, the display control information may be generated that causes Route Y to be displayed with a dotted line as a route from the own vehicle MB to the waypoint WP.

In contrast, if it is not determined that the display region of the route on which the own vehicle MB is traveling and which is displayed on the display 140 is greater than or equal to the predetermined region (Step S1054: NO), the display control information generation unit 213 may end the process.

<Working and Effects>

As described above, the display control system 1 according to the first example embodiment includes the vehicle navigation apparatus 100 and the display control apparatus 200. The display control apparatus 200 includes at least one processor 210 that determines the driving entity of the own vehicle MB. In a case where the driving entity of the own vehicle MB is determined as being the vehicle, the at least one processor 210 calculates at least the reliability of the route information included in the first map information, and sends the vehicle navigation apparatus 100 the display control information to change the form of displaying the route information on the display 140 in accordance with the reliability of the route information.

That is, while the vehicle is traveling in the automatic driving mode or the driving assistance mode, the display control system 1 according to the first example embodiment calculates at least the reliability of the route information included in the first map information, and changes the form of displaying the route information on the display 140 of the vehicle navigation apparatus 100 in accordance with the reliability of the route information.

This allows the traveling route on which the own vehicle is to travel to be displayed in different forms in accordance with the reliability of the traveling route, to thereby allow the occupant of the vehicle to recognize in advance an unexpected course change to be generated in the automatic driving mode or the driving assistance mode. It is therefore possible to reduce the strange feeling of the occupant of the vehicle.

The display control system 1 according to the first example embodiment may store the calculated reliability in the memory in correlation with the first map information.

The reliability having been determined once does not change unless a road included in the route or the surrounding environment changes largely.

Additionally, the navigation map is updated only at a constant interval in order to reduce the time and cost for the updating process.

Accordingly, storing the calculated reliability in the memory in correlation with the first map information enables quick access to the reliability of the retrieved route information, to thereby instantly change the form of displaying.

In a case where the route information based on the information on the position of the own vehicle does not match with the route information of the first map information, the display control system 1 according to the first example embodiment may calculate or evaluate the reliability of the route information as being low.

The fact that the route information based on the information on the position of the own vehicle does not match with the route information in the first map information means that the route information based on the information on the position of the own vehicle is inexistent in the first map information.

If the route information based on the information on the position of the own vehicle is inexistent in the first map information, the recommendation level of the route information is also inexistent. Consequently, the reliability is determined as being at low level regardless of the levels of the other parameters.

In a case where there is two or more pieces of recommended route information having the same recommendation level as the route information based on the information on the position of the own vehicle, the display control system 1 according to the first example embodiment may calculate or evaluate the reliability of each pieces of the recommended route information as being low.

If there are two or more pieces of the recommended route information having the same recommendation level as the route information based on the information on the position of the own vehicle, the own vehicle may possibly travel on either of the recommended routes.

Thus, if there are two or more pieces of the recommended route information having the same recommendation level as the route information based on the information on the position of the own vehicle, the reliability of each pieces of the recommended route information is calculated or evaluated as being low. This allows the occupant of the vehicle to recognize in advance the presence of two or more pieces of the recommended route information having low reliability whichever recommended route the own vehicle is traveling on. It is therefore possible to reduce the strange feeling of the occupant of the vehicle.

The display control system 1 according to the first example embodiment may control the display 140 to cause two or more pieces of the recommended route information having the same recommendation level to be continuously displayed on the display 140.

If there are two or more pieces of the recommended route information having the same recommendation level as the route information based on the information on the position of the own vehicle, the own vehicle may possibly travel on either of the recommended routes.

Thus, if there are two or more pieces of the recommended route information having the same recommendation level as the route information based on the information on the position of the own vehicle, the reliability of each pieces of the recommended route information may be calculated or evaluated as being low, and the two or more pieces of the recommended route information may be continuously displayed while the own vehicle is traveling. This allows the occupant of the vehicle to recognize in advance the presence of two or more pieces of the recommended route information having low reliability whichever recommended route the own vehicle is traveling on. It is therefore possible to reduce the strange feeling of the occupant of the vehicle.

In a case where the number of re-searching for the route, which is performed when the vehicle deviates from a route currently set, is greater than or equal to the predetermined number, the display control system 1 according to the first example embodiment of the technology may evaluate the reliability of the route information as being low.

In the case where the number of re-searching for the route, which is performed when the vehicle deviates from the route currently set, is greater than or equal to the predetermined number, it is highly possible that the route selected on the vehicle side does not match with the navigation map.

Accordingly, in a case where the number of re-searching for the route, which is performed when the vehicle deviates from the route currently set, is greater than or equal to the predetermined number, the reliability of the route information may be calculated or evaluated as being low, and indication may be displayed about the low reliability of the route information due to the number of re-searching for the route being greater than or equal to the predetermined number. This allows the occupant of the vehicle to recognize in advance the low reliability of the route information due to the number of re-searching for the route being greater than or equal to the predetermined number. It is therefore possible to reduce the strange feeling of the occupant of the vehicle.

In a case where the display region of the display 140 is greater than or equal to the predetermined region, the display control system 1 according to the first example embodiment of the technology may calculate or evaluate the reliability of the route information as being low.

The term "predetermined region" used herein may refer to an exemplary range in which the high-definition map is able to be displayed.

That is, in a case where the display region of the display 140 is greater than or equal to the predetermined region, the display region of the display 140 may be greater than the range in which the high-definition map is able to be displayed.

Accordingly, in the case where the display region of the display 140 is greater than or equal to the predetermined region, the reliability of the route information may be calculated or evaluated as being low, and the indication may be displayed about the low reliability of the route information due to the display region being greater than or equal to the predetermined region. This allows the occupant of the vehicle to recognize in advance the low reliability of the route information due to the display region being greater than or equal to the predetermined region. It is therefore possible to reduce the strange feeling of the occupant of the vehicle.

Second Example Embodiment

The display control system 1 according to a second example embodiment of the technology will now be described with reference to FIGS. 11 to 14.

<Exemplary Configuration of Processor 210A>

Figure 11:
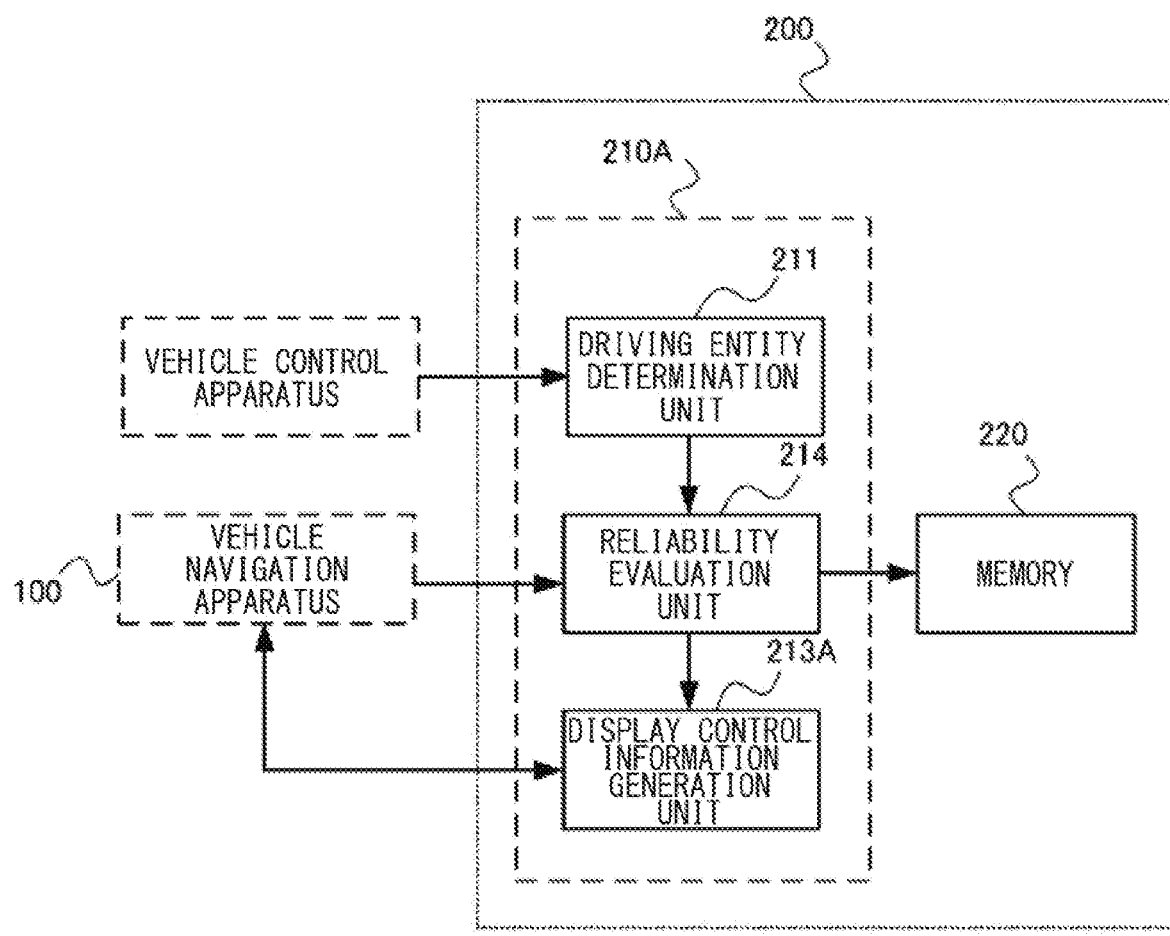
FIG. 11 is a block diagram illustrating an exemplary configuration of the display control apparatus according to one example embodiment of the technology.

As illustrated in FIG. 11, a processor 210A may include the driving entity determination unit 211, a display control information generation unit 213A, and a reliability evaluation unit 214.

Note that components having configurations similar to those of the components in the first example embodiment are denoted with the same reference numerals without redundant description.

The reliability evaluation unit 214 may calculate or evaluate the reliability of route information as being low in a case where the route is distant from the position of the own vehicle by a predetermined distance.

For example, the reliability evaluation unit 214 may acquire the information on the position (e.g., the latitude and longitude) of the own vehicle) and the information on the position (e.g., the latitude and longitude) of retrieved route from the vehicle navigation apparatus 100, and evaluate the reliability of the route information as being low in a case where the retrieved route is distant from the position of the own vehicle by the predetermined distance.

The term "predetermined distance" used herein may refer to a relatively large distance, e.g., 1 km.

The display control information generation unit 213A may acquire, for example, the information on the position (e.g., the latitude and longitude) of the own vehicle and the information on the position (e.g., the latitude and longitude) of the retrieved route from the vehicle navigation apparatus 100. In a case where the route is distant from the position of the own vehicle by the predetermined distance, the display control information generation unit 213A may generate the display control information, and send the generated display control information to the display control unit 150.

<Exemplary Processing Performed by Display Control System 1>

Exemplary processing performed by the display control system 1 according to the second example embodiment of the technology will now be described with reference to FIGS. 12 and 13.

Figure 12:
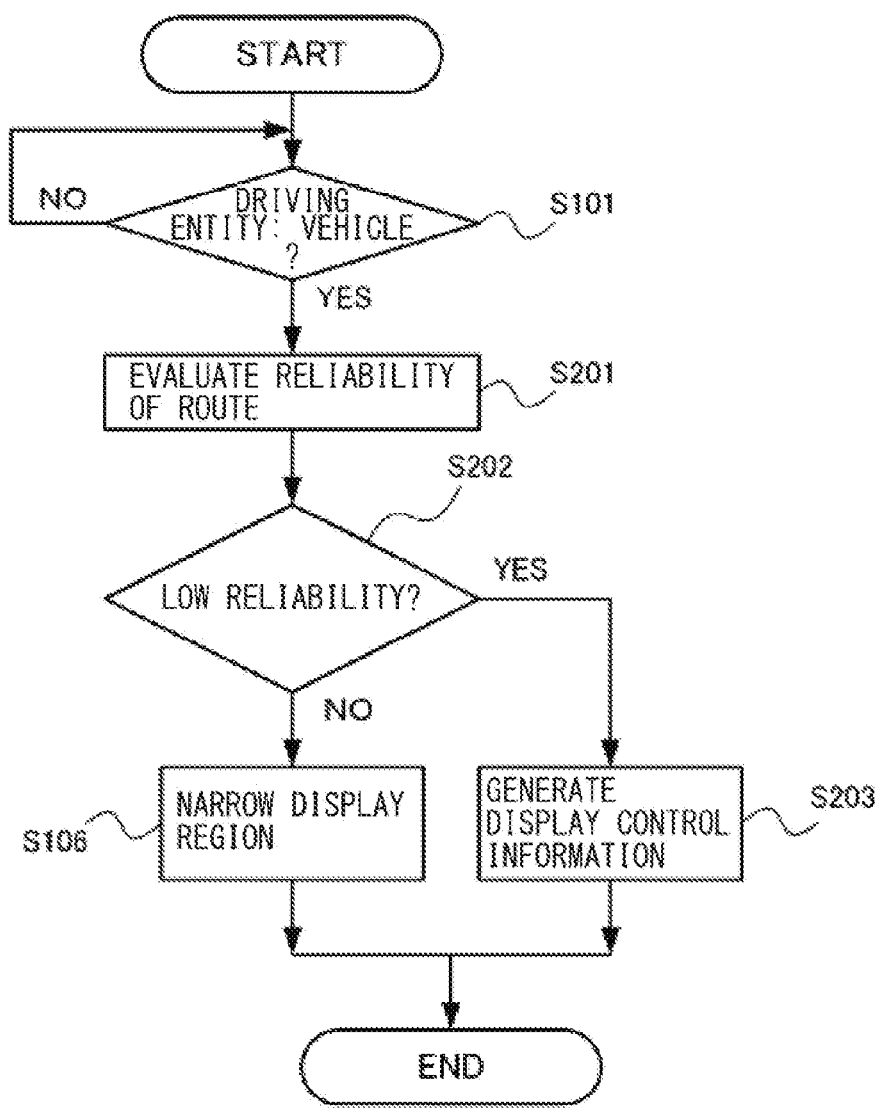
FIG. 12 is a flowchart of exemplary processing performed by the display control apparatus according to one example embodiment of the technology.

As illustrated in FIG. 12, the driving entity determination unit 211 may receive the information as to whether the own vehicle is driven in the automatic driving mode or the driving assistance mode from, for example, the vehicle control apparatus mounted in the own vehicle, to thereby determine the driving entity of the own vehicle (Step S101).

If the driving entity determination unit 211 does not determine that the driving entity of the own vehicle is the vehicle (Step S101: NO), the processing may repeat Step S101.

In contrast, if the driving entity determination unit 211 determines that the driving entity of the own vehicle is the vehicle (Step S101: YES), the reliability evaluation unit 214 may evaluate the reliability of the retrieved route on the basis of, for example, the information on the retrieved route and the information on the position of the own vehicle received from the vehicle navigation apparatus 100 (Step S201).

Figure 13:
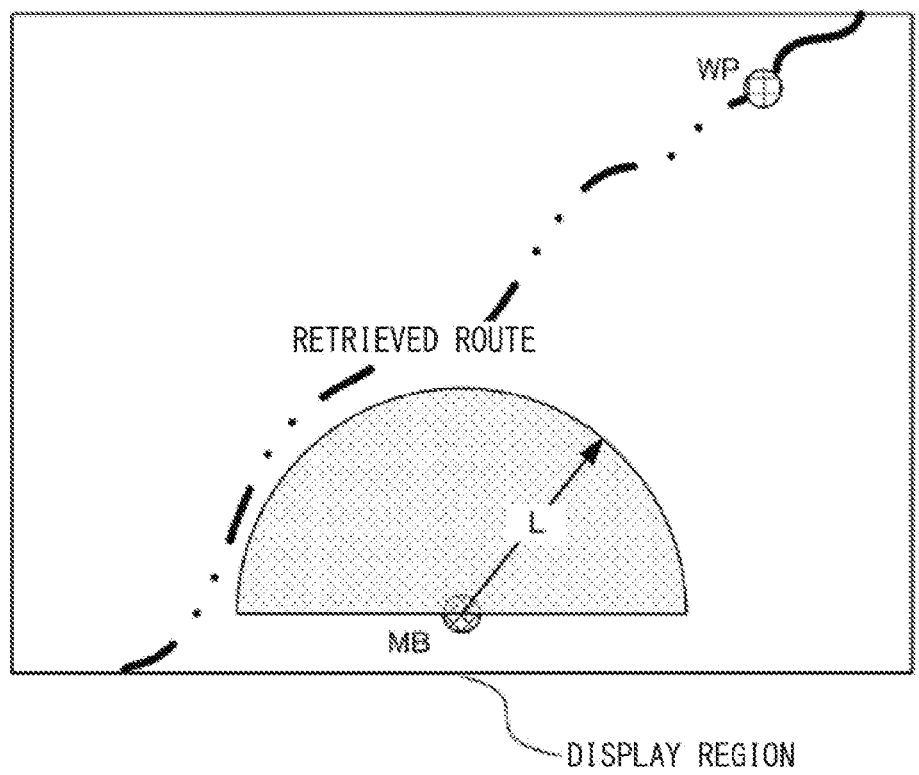
FIG. 13 is a diagram illustrating an exemplary form of displaying the route information, according to one example embodiment of the technology, in a case where the route is distant from the position of the own vehicle by a predetermined distance, according to one example embodiment of the technology.

For example, the reliability evaluation unit 214 may evaluate the reliability of route information as being low in a case where the route is distant from the position of the own vehicle by the predetermined distance (e.g., a distance L in FIG. 13).

The display control information generation unit 213A may determine whether the reliability evaluated by the reliability evaluation unit 214 is low (Step S202).

The phrase "the reliability evaluated as being low" used herein may refer to reliability lower than an average value of all the levels of reliability evaluated. Note that the criteria of the evaluation may be changed as appropriate.

If the display control information generation unit 213A determines that the reliability of the route information is low (Step S202: YES), the display control information generation unit 213A may perform the reliability display process to generate the display control information (Step S203). Thereafter, the processing may end.

For example, the display control information generation unit 213A may generate the display control information that causes the retrieved route to be displayed with a dotted line, as illustrated in FIG. 13.

In contrast, if the display control information generation unit 213A does not determine that the reliability of the route information is low (Step S202: NO), the display control information generation unit 213A may generate the display control information that narrows the display region (Step S106). Thereafter, the processing may end.

<Working and Effects>

As described above, the display control system 1 according to the second example embodiment may evaluate the reliability of the route information as being low in a case where the route is distant from the position of the own vehicle by the predetermined distance.

In a case where the route is distant from the position of the own vehicle by the predetermined distance, it is highly possible that there is another potential route other than the route.

Accordingly, the display control system 1 may evaluate the reliability of the route as being low in a case where the route is distant from the position of the own vehicle by the predetermined distance, and change the form of displaying the route. This allows the occupant of the vehicle to recognize in advance an unexpected route change to be generated in the automatic driving mode or the driving assistance mode. It is therefore possible to reduce the strange feeling of the occupant of the vehicle.

Modification Example 1

In the first example embodiment, the form of displaying a route is changed in a case where the route is inexistent in the first map information; however, in a case where the own vehicle is traveling on a route inexistent in the first map information, the traveling track of the own vehicle may be displayed and then stored in the vehicle navigation apparatus 100.

Storing the traveling track on a road inexistent in the first map information helps the vehicle navigation apparatus 100 to instantly change the form of displaying the route when the own vehicle is traveling on the same route afterwards.

Modification Example 2

In a case where the vehicle navigation apparatus 100 is a cloud navigation apparatus and where the own vehicle is traveling on a route inexistent in the first map information, the traveling track of the own vehicle may be sent to and stored in the cloud server.

Such processing helps to change the form of displaying at the timing of reception of the data on the route from the cloud server when the own vehicle travels on the same route afterwards.

Note that the display control system according to any of the example embodiments of the technology is implemented by storing the processing to be performed by the processor 210 in a recording medium readable by a computer system, causing the memory 220 to read a program stored in the recording medium, and executing the program. The term "computer system" used herein may encompass hardware including operating systems (OS) and peripheral devices.

Note that a plurality of processors 210 may be provided, or a plurality of memories 220 may be provided.

In a case where the computer system is a world wide web (www) system, the term "computer system" used herein shall encompass a website providing environment or a display environment. Additionally, the program stored in, for example, the storage device of the computer system may be transmitted to another computer system via a transmission medium or a transmission wave of the transmission medium. The transmission medium transmitting the program may refer to a medium having a function of transmitting information, including a network such as the Internet (a communication network) and a communication line such as a phone line (a communication line).

Further, the program described above may be a program for implementing part of the processing performed by the display control system according to the example embodiment of the technology described above.

Alternatively, the program described above may be a so-called differential file or differential program that implements the processing performed by the display control system according to the example embodiment described above when being combined with a program having been stored in the computer system.

Some example embodiments of the technology have been described above with reference to the drawings. However, specific configurations of the technology should not be limited to these example embodiments, and may be modified in variety of ways without departing from the gist of the technology.

One or more of the position information acquisition unit 120, the route information searching unit 130, the display control unit 150, and the display control apparatus 200 in FIG. 2 are implementable by circuitry including at least one semiconductor integrated circuit such as at least one processor (e.g., a central processing unit (CPU)), at least one application specific integrated circuit (ASIC), and/or at least one field programmable gate array (FPGA). At least one processor is configurable, by reading instructions from at least one machine readable non-transitory tangible medium, to perform all or a part of functions of the position information acquisition unit 120, the route information searching unit 130, the display control unit 150, and the display control apparatus 200. Such a medium may take many forms, including, but not limited to, any type of magnetic medium such as a hard disk, any type of optical medium such as a CD and a DVD, any type of semiconductor memory (i.e., semiconductor circuit) such as a volatile memory and a non-volatile memory. The volatile memory may include a DRAM and a SRAM, and the nonvolatile memory may include a ROM and a NVRAM. The ASIC is an integrated circuit (IC) customized to perform, and the FPGA is an integrated circuit designed to be configured after manufacturing in order to perform, all or a part of the functions of the position information acquisition unit 120, the route information searching unit 130, the display control unit 150, and the display control apparatus 200.

The invention claimed is:

1. A display control system comprising:
a vehicle navigation apparatus including:
   a storage configured to store first map information; and
   a display configured to display data including (1) the first map information, (2) route information about a route to be set based on a position information on a position of a vehicle, destination information about a destination to be set by an occupant of the vehicle, and the first map information, and (3) the position information of the vehicle; and
a display control apparatus including:
   at least one processor; and
   at least one memory that is communicably coupled to the at least one processor and stores instructions, when executed by the at least one processor, causing the at least one processor to be configured to:
   determine that a driving entity that controls driving of the vehicle is the vehicle itself, and determine that the vehicle is traveling along the route that is being displayed on the display of the vehicle navigation apparatus;
   calculate or evaluate, in a case where the driving entity is the vehicle itself, a reliability of the route information included in the first map information using an index obtained by aggregating responses from users who have experience traveling the route in the route information, the reliability being based at least in part on a combination of parameters including a recommendation level, a number of routes having a similar recommendation level, a number of route recalculation operations within a predetermined time, and a display region, and calculated according to the following expression:

reliability=recommendation level/(number of routes having a similar recommendation level×number of route recalculation operations within a predetermined time×display region);

determine whether the reliability of the route information is less than or equal to a predetermined value;
   in response to determining that the reliability of the route information is not less than or equal to the predetermined value, generate a first display control information to control the display such that the route information is displayed as a solid line on the display;
   in response to determining that the reliability of the route information is less than or equal to the predetermined value, generate a second display control information to control the display such that the route information is displayed as a dotted line on the display; and
   control the display based on the first display control information or the second display control information.

2. The display control system according to claim 1, wherein the at least one processor is configured to store the reliability calculated or evaluated in the at least one memory in correlation with the first map information.

3. The display control system according to claim 1, wherein, in a case where the route information based on the position information does not match with the route information in the first map information, the at least one processor is configured to calculate or evaluate the reliability of the route information as being less than or equal to the predetermined value.

4. The display control system according to claim 1, wherein, in a case where there is a recommended route information having an index equal to the index of the route information, the at least one processor is configured to:
   calculate or evaluate the reliability of the route information as being low;
   generate a third display control information to control the display such that the recommended route information is displayed on the display; and
   control the display based on the third control information.

5. The display control system according to claim 1, wherein, in a case where how frequently re-searching that is performed when the vehicle deviates from a route currently set is greater than or equal to a predetermined number, the at least one processor is configured to calculate or evaluate the reliability of the route information as being low.

6. The display control system according to claim 1, wherein, in a case where a display region of the display is greater than or equal to a predetermined region, the at least one processor is configured to calculate or evaluate the reliability of the route information as being low.

7. The display control system according to claim 1, wherein, in a case where the route is distant from the position of the vehicle by a predetermined distance, the at least one processor is configured to calculate or evaluate the reliability of the route information as being low.

8. A display control system comprising:
a storage configured to store first map information;
a display configured to display data including the first map information, route information about a route, and position information on a position of a vehicle; and
circuitry configured to:
   acquire the position information;
   search for the route information on a basis of the position information, destination information on a destination point to be set by an occupant of the vehicle, and the first map information;
   determine that a driving entity that controls driving of the vehicle is the vehicle itself, and determine that the vehicle is traveling along the route that is being displayed on the display;
   in a case where the driving entity is the vehicle itself, calculate or evaluate, a reliability of the route information included in the first map information using an index obtained by aggregating responses from users who have experience traveling the route in the route information, the reliability being based at least in part on a combination of parameters including a recommendation level, a number of routes having a similar recommendation level, a number of route recalculation operations within a predetermined time, and a display region, and calculated according to the following expression:

reliability=recommendation level/(number of routes having a similar recommendation level×number of route recalculation operations within a predetermined time×display region);

determine whether the reliability of the route information is less than or equal to a predetermined value;

in response to determining that the reliability of the route information is not less than or equal to the predetermined value, generate a first display control information to control the display such that the route information is displayed as a solid line on the display;

in response to determining that the reliability of the route information is less than or equal to the predetermined value, generate a second display control information to control the display such that the route information is displayed as a dotted line on the display; and control the display based on the first display control information or the second display control information.

* * * * *